3,584,367
METHOD FOR PRODUCING CORRUGATED TUBES HAVING MULTIPLE WALLS
Jorgen Kiersgaard, Nordborg, Denmark, assignor to Danfoss A/S, Nordborg, Denmark
Continuation of application Ser. No. 585,387. Oct. 10, 1966. This application Aug. 13, 1969, Ser. No. 849,930
Claims priority, application Germany, Oct. 9, 1965, 48,392/65
Int. Cl. B23p 17/00, 19/04
U.S. Cl. 29—421                    5 Claims

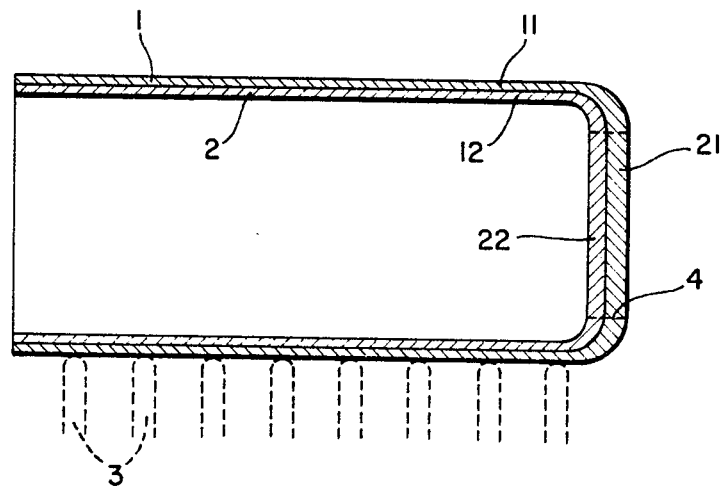

ABSTRACT OF THE DISCLOSURE

The invention relates to a method for producing corrugated tubes having multiple walls which may be used as bellows and have other uses. Starting with two thin plates, a temperature resistant protective coating of a material such as titanium is applied to at least one plate and the plates are superimposed with the coating being between the plates. The plates are subjected to a deep drawing operation to form a double walled cup shaped member which is subsequently subjected to a corrugating operation. The temperature-resistant coating prevents the welding together of the two plates during the drawing operation so that engaging portions of the plates are relatively displaceable during the corrugating operation. This mobility or relative displaceability of the plates prevents stresses from forming which would otherwise cause undesired distortions of the metal during the corrugating operation.

---

This application is a continuation of application Ser. No. 585,387, filed Oct. 10, 1966, now abandoned.

This invention relates to a method for producing corrugated tubes having multiple walls, and in particular, but not exclusively, double walled corrugated tubes, whereby a blank consisting of several united tubes is grooved to form corrugations.

Corrugated tubes are employed as components in the pressure cells of thermostatic operating elements, as movable links between two pipes or movable envelope seals etc. Multiple-wall corrugated tubes are superior to single-wall corrugated tubes in that they can be made more flexible.

In the manufacture of multi-wall corrugated tubes, a tubular blank is first produced to which the corrugations are then imparted by external or internal grooving. Up to now considerable difficulties have been experienced in the manufacture of a double or multiple wall blank. It has been necessary to pre-fabricate two or more blanks with very close tolerances, to telescope them and solder them together, at least at one end, before they could be subjected to the grooving operation.

This necessitated several operations. Moreover, it was never possible to avoid the inclusion of air between the two walls. This led to irregular deformation of adjacent wall portions during grooving. Furthermore, there was always a certain waste because the thin-walled cylindrical tubes were easily compressed during handling, for example when telescoped into one another.

It is an object of the present invention to simplify considerably the manufacture of blanks for multiple-wall corrugated tubes, to reduce waste and to improve the quality of the finished corrugated tube, particularly its flexibility, in comparison with known corrugated tubes of this type.

This object is achieved, according to the present invention, in that the blank is produced by drawing a cup-shaped structure from at least two superimposed plates.

In this way, the tubes comprising a multiple-wall blank are formed and united in a manner suitable for grooving by one and the same operation. Tolerances are no problem in this process as the tubes bear directly on one another without air inclusions. Consequently, every tube is deformed in a uniform manner during grooving. The result is a corrugated tube of improved quality and greater flexibility.

Another advantage is that a very rigid bottom portion is produced automatically during the formation of the blank. The rigid bottom portion enables manipulation of the blank from this end without the likelihood of damage. The bottom portion retains the thickness of the original material and remains sufficiently rigid to serve as an abutment plate for an actuating element. Moreover, it encloses the interior of the two tubes at one end, so that the blank is rendered particularly suitable for hydraulic deformation from within. However, should the bottom portion not be needed, for example in the case of a movable pipe link, it may be punched out before or after the drawing operation, either completely or in such a way that a mounting flange remains.

As the plates are very thin, and as they are deeply drawn, care must be taken to avoid splitting of the outer plate, which is most severely stressed. For this purpose the die preferably has a conically flared entry aperture and the drawing is preferably carried out in stages with annealing between successive stages.

Further, the tubes, while supposed to fit closely into one another, should still have a certain mobility at the separating surfaces when all deforming processes have terminated. In the case of known manufacturing processes, the tolerance between the tubes ensured such mobility although at the price of air inclusions. However, this mobility is also preserved after a slow drawing process. The drawing process is facilitated by applying an isolating agent between the superimposed plates prior to drawing. Alternatively, a highly temperature-resistant protective layer may be applied to at least one plate on the face adjacent the other plate, in order to prevent the welding together of the plates. A protective layer of titanium, for example, may be applied to at least one plate on the face adjacent the other plate or a protective layer may be generated between the plate surfaces by an alloy ingredient. Obviously, plates may also be employed which consist throughout of highly temperature-resistant material.

The accompanying drawing illustrates in section a blank manufactured according to the invention. The blank shown in the drawing consists of two telescoped cup-shaped components 1, 2 each of which comprise a cylindrical surface 11, 12 respectively and a bottom portion 21, 22 respectively. The components have been deep-drawn in a single operation from two superimposed plates the thickness of which corresponds approximately to that of the bottom portions 21, 22. Subsequent grooving is accomplished by means of dies or tools 3 indicated by broken lines, which either exert radial pressure toward the center or are provided as annular abutments if grooving is to be carried out hydraulically by means of fluid pressure acting in the interior of the blank to expand the blank in the die.

If the bottom portions 21, 22 are preserved, a bellows is obtained which is capable of being employed for thermostatic operating elements. However, if a hole, the boundary of which is indicated by the broken line 4, is punched out of the bottom, the corrugated tube may also serve for conducting a fluid. The thicker portion of material surrounding the hole provides a mounting flange.

What I claim and desire to be secured by Letters Patent is:

1. A process for producing a multi-wall corrugated bellows which comprises, applying a temperature resistant weld preventing protective coating to a first metallic plate which coating is not subject to melting during a subsequent deep drawing operation, superimposing said first metallic plate on a second metallic plate with said coating being between said plates, subjecting said metallic plates to a deep-drawing operation to form a multi-wall elongated tubular structure having a closed end portion, continuing said deep-drawing operation to reduce the thickness of said plates along portions defining walls of said tubular structure without reducing the thickness of said end portion, continuing the reduction of said walls to an extent to render them flexible for expansion and contraction upon application of varying internal pressure, and developing corrugations in said walls of said structure to form an expansible and contractable corrugated bellows.

2. A process according to claim 1, in which the drawing operation is carried out in stages and the material is annealed between any two stages.

3. A process according to claim 1, in which at least a portion of said end portion is removed.

4. A process according to claim 1, in which said cup-shaped structure is expanded by fluid pressure in die means for forming corrugations therein.

5. A process according to claim 1 in which said temperature resistant protective coating is titanium.

References Cited

UNITED STATES PATENTS

| | | | |
|---|---|---|---|
| 2,032,555 | 3/1936 | Ward | 113—116(B) |
| 2,232,098 | 2/1941 | Deichman. | |
| 2,372,917 | 4/1945 | Tuttle. | |
| 2,434,794 | 1/1948 | Giesler. | |
| 2,232,098 | 2/1941 | Deichman | 29 Draw Dig UX |
| 2,372,917 | 4/1945 | Tuttle | 29—421UX |
| 2,434,794 | 1/1948 | Giesler | 29—454UX |

FOREIGN PATENTS

| | | | |
|---|---|---|---|
| 776,451 | 6/1957 | Great Britain | 29—454 |
| 1,332,850 | 6/1963 | France | 29—516 |

CHARLIE T. MOON, Primary Examiner

U.S. Cl. X.R.

29—454, 516, 523; 92—47; 113—116; 138—173